US012705823B2

(12) United States Patent
Herman et al.

(10) Patent No.: US 12,705,823 B2
(45) Date of Patent: Aug. 11, 2026

(54) ADAPTIVE OPTIMAL VIEWPOINT SELECTION FOR A VEHICLE DISPLAY

(71) Applicant: Ford Global Technologies, LLC, Dearborn, MI (US)

(72) Inventors: David Michael Herman, West Bloomfield, MI (US); Yashanshu Jain, Dearborn, MI (US); Shaheer Zafar, Chicago, IL (US); Gaurav Sharma, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 18/316,366

(22) Filed: May 12, 2023

(65) Prior Publication Data

US 2024/0378796 A1 Nov. 14, 2024

(51) Int. Cl.
*G06T 15/20* (2011.01)
*G06T 19/00* (2011.01)

(52) U.S. Cl.
CPC ............ *G06T 15/20* (2013.01); *G06T 19/006* (2013.01); *G06T 2200/24* (2013.01)

(58) Field of Classification Search
CPC ... G06T 15/20; G06T 19/006; G06T 2200/24; B60K 35/232; B60K 35/235; B60K 35/233; B60K 2360/177; B60K 2360/31; B60R 1/27; B60R 1/28
See application file for complete search history.

(56) References Cited

U.S. PATENT DOCUMENTS

| | | | |
|---|---|---|---|
| 8,403,490 | B2 | 3/2013 | Sugiyama et al. |
| 9,097,890 | B2 | 8/2015 | Miller et al. |
| 9,212,926 | B2 | 12/2015 | Attard et al. |

(Continued)

FOREIGN PATENT DOCUMENTS

| | | | |
|---|---|---|---|
| CN | 105301774 | A | 2/2016 |
| CN | 109212753 | B | 1/2021 |

(Continued)

OTHER PUBLICATIONS

Non-Final Office Action for U.S. Appl. No. 18/187,962, filed Mar. 22, 2023, as issued by the USPTO on Oct. 2, 2023.

(Continued)

*Primary Examiner* — Devona E Faulk
(74) *Attorney, Agent, or Firm* — Frank Lollo; Brooks Kushman P.C.

(57) ABSTRACT

Apparatus and methods disclosed herein provide an optimal viewpoint from which a virtual camera views a scene in an environment surrounding an ego vehicle. A first value is determined indicating an extent to which a first view from a default viewpoint of the virtual camera satisfies first and second view observation objectives. A second value is determined indicating an extent to which a second view from an alternative viewpoint of the virtual camera satisfies the first and second view observation objectives. If the second value exceeds the first value by an amount greater than a specified criterion value, the alternative viewpoint is selected for the virtual camera. If the second value does not exceed the first value by an amount greater than the specified criterion value, the default viewpoint is selected for the virtual camera.

20 Claims, 9 Drawing Sheets

(56) References Cited

U.S. PATENT DOCUMENTS

| | | | | |
|---|---|---|---|---|
| 9,851,565 | B1 | 12/2017 | Miao | |
| 10,302,943 | B2 | 5/2019 | Asai | |
| 11,181,743 | B2 | 11/2021 | Nakada et al. | |
| 11,378,916 | B2 | 7/2022 | Shi | |
| 11,420,680 | B2 | 8/2022 | Wall et al. | |
| 2005/0240342 | A1 * | 10/2005 | Ishihara | G08G 1/167 701/1 |
| 2007/0159410 | A1 | 7/2007 | Yamamoto et al. | |
| 2013/0033602 | A1 * | 2/2013 | Quast | B60R 1/27 348/148 |
| 2013/0145360 | A1 | 6/2013 | Ricci | |
| 2017/0269684 | A1 | 9/2017 | Murai | |
| 2018/0012089 | A1 | 1/2018 | Ricci | |
| 2018/0281856 | A1 | 10/2018 | Talamonti et al. | |
| 2019/0164430 | A1 * | 5/2019 | Nix | B60R 11/04 |
| 2019/0339535 | A1 | 11/2019 | Abi-Chaaya et al. | |
| 2020/0225482 | A1 | 7/2020 | Bodiya et al. | |
| 2020/0241300 | A1 * | 7/2020 | Robinson | G02B 27/0172 |
| 2021/0165220 | A1 | 6/2021 | Nakada et al. | |
| 2021/0373330 | A1 | 12/2021 | Urey et al. | |
| 2021/0397247 | A1 | 12/2021 | Wieczorek et al. | |
| 2022/0009492 | A1 | 1/2022 | Adwan | |
| 2022/0274646 | A1 | 9/2022 | Shimanaka et al. | |

FOREIGN PATENT DOCUMENTS

| | | | |
|---|---|---|---|
| DE | 102007025531 | A1 | 12/2008 |
| DE | 102015215180 | A1 | 2/2017 |
| DE | 102021209616 | B3 | 7/2022 |
| JP | 4481187 | B2 | 6/2010 |
| JP | 202124402 | A | 2/2021 |
| JP | 202226522 | A | 2/2022 |
| KR | 20170056750 | A | 5/2017 |
| WO | 2021122891 | A1 | 6/2021 |
| WO | 2021218602 | A1 | 11/2021 |

OTHER PUBLICATIONS

Advisory Action for U.S. Appl. No. 18/187,962, filed Mar. 22, 2023, as issued by the USPTO Apr. 26, 2024.

Final Office Action for U.S. Appl. No. 18/187,962, filed Mar. 22, 2023, as issued by the USPTO Mar. 13, 2024.

Brown, "Adjusted Minimum Time-To-Collision(TTC): A Robust Approach to Evaluating Crash Scenarios", DSC 200-5 North America—Orlando—Nov. 2005.

Ceres Holographics, Texas Instruments and Ceres Holographics Demonstrate Automotive-qualified Holographic-Enabled Transparent Display Solutions, Joint Solution Presented at the Society of Information Display (SID) Vehicles Displays Detroit Virtual Event, Oct. 14, 2020.

Jeffrey, "Study suggests that HUD tech may actually reduce driving safety", Jun. 29, 2015, https://newatlas.com/hud-technology-driving-sasfety/38204/.

Lefèvre et al., "A survey on motion prediction and risk assessment for intelligent vehicles", Lefèvre et al. ROBOMECH Journal 2014, 1:1, http://www.robomechjournal.com/content/1/1/1.

Pauzie, "Head Up Display in Automotive: A New Reality for the Driver", International Conference of Design, User Experience, and Usability, DUXU 2015, https://link.springer.com/chapter/10.1007/978-3-319-20889-3_47.

Pavel et al., "Vision-Based Autonomous Vehicle Systems Based on Deep Learning: A Systematic Literature Review", Appl. Sci. 2022, 12, 6831. https://doi.org/10.3390/app12146831, https://www.mdpi.com/journal/applsci.

Dong, R. et al., "Viewpoint Optimization Using Genetic Algorithm for Flying Robot Inspection of Electricity Transmission Tower Equipment," ResearchGate, Apr. 2014, 7 pages.

Non-Final Office Action dated Dec. 18, 2025 re U.S. Appl. No. 18/295,951, filed Apr. 5, 2023 (55 pages).

Non-Final Office Action dated Oct. 24, 2025 re U.S. Appl. No. 18/295,951, filed Apr. 5, 2023.

Final Office Action dated Jan. 29, 2026 re U.S. Appl. No. 18/295,951, filed Apr. 5, 2023 (47 pages).

* cited by examiner

800
START
805
DETECT VIEWPOINT UPDATE
810
GET VIEW FROM ALTERNATE VIEWPOINT

820
RENDER ALT VIEW ON DISPLAY
825
START TIMER
830
GET USER GAZE
NO
860
TIMER EXPIRED?
NO
USER GAZE ON DISPLAY DEVICE?
YES
835
NO
VIEWPOINT EXPIRED ?
YES
837
YES
DISPLAY UPDATED VIEW ON AR HUD
865
NO
END EVENT?
YES
END
855
RENDER DEFAULT VIEWPOINT
850
GET VIEW FROM DEFAULT VIEWPOINT
815
REVERT TO DEFAULT VIEWPOINT

ADAPTIVE OPTIMAL VIEWPOINT SELECTION FOR A VEHICLE DISPLAY

BACKGROUND

A vehicle system can include perception, prediction and planning subsystems. A perception subsystem typically includes multiple vehicle-mounted sensors to capture views of the vehicle's surroundings. A prediction subsystem may predict trajectories of observation objects detected in the captured views. A planning subsystem may plan a trajectory for the vehicle based on the predicted trajectories of the observation objects detected in the captured views. An advanced driver assistance system (ADAS) can provide a vehicle operator with virtual views of a real-time driving situation based on vehicle motion and path planning. Operational scenarios may arise and/or change while a vehicle is operating without any changes in the vehicle's motion and/or planned path. In such situations, a default view in a vehicle display may not be optimal to meet given occupant observation objectives.

DESCRIPTION

The present disclosure includes techniques for selecting an optimal viewpoint from which to obtain a view to render on a vehicle display. As described herein, the optimal viewpoint is an alternative to a default viewpoint may be identified and that provides a view that meets view criteria to a greater extent than a view from the default viewpoint. Accordingly, the disclosure provides systems and methods that determine which of a default view and possible alternative views is optimal view for the user to view a current situation.

Figure 1:
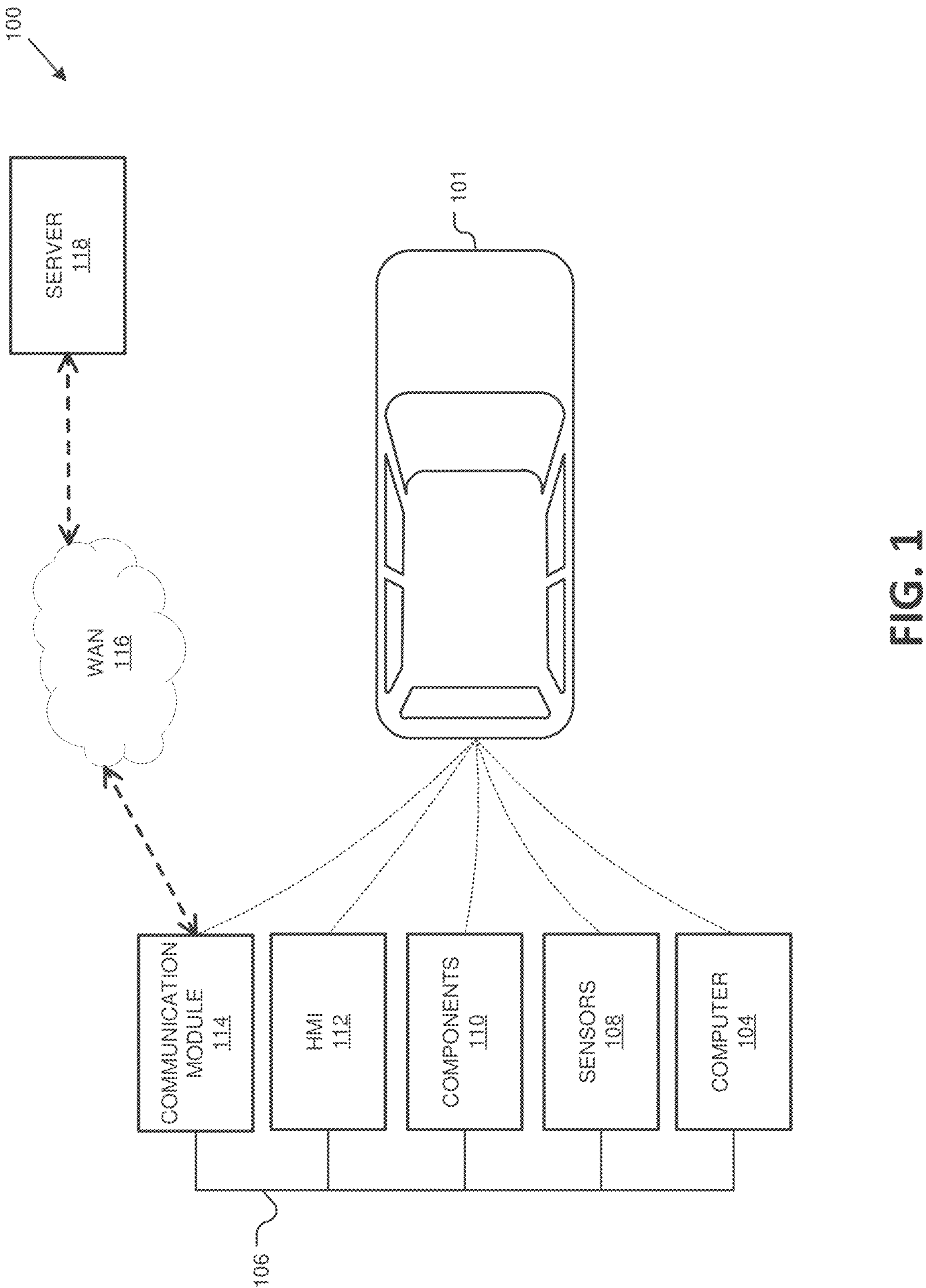
FIG. 1 is a block diagram of an exemplary vehicle system.

As seen in FIG. 1, a system 100 includes a host vehicle 101 that in turn includes a computer 104 that is communicatively coupled via a communication network, such as a vehicle network 106, with various elements including sensors 108, subsystems or components 110 such as steering, propulsion, and braking, a human machine interface (HMI) 112, and a communication module 114.

The vehicle computer 104 (and also a remote server 118 discussed below) includes a processor and a memory. A memory of a computer 104 such as those described herein includes one or more forms of computer 104 readable media, and stores instructions executable by the vehicle computer 104 for performing various operations, such that the vehicle computer is configured to perform the various operations, including as disclosed herein.

For example, a vehicle computer 104 can be a generic computer 104 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 108 data and/or communicating the sensor 108 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 104. Further, the vehicle computer 104 could include a plurality of computers 104 in the vehicle, e.g., a plurality of ECUs (electronic control units) or the like, operating together to perform operations ascribed herein to the vehicle computer 104.

The memory can be of any type, e.g., hard disk drives, solid state drives, servers 118, or any volatile or non-volatile media. The memory can store the collected data sent from the sensors 108. The memory can be a separate device from the computer 104, and the computer 104 can retrieve information stored by the memory via a communication network in the vehicle such as the vehicle network 106, e.g., over a CAN bus, a wireless network, etc. Alternatively or additionally, the memory can be part of the computer 104, e.g., as a memory of the computer 104.

The computer 104 may include programming to operate one or more components 110 such as vehicle brakes, propulsion (e.g., one or more of an internal combustion engine, electric motor, hybrid engine, etc.), steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus as described further below, more than one processor, e.g., included in components 110 such as sensors 108, electronic control units (ECUs) or the like included in the vehicle for monitoring and/or controlling various vehicle components, e.g., a powertrain controller, a brake controller, a steering controller, etc.

The computer 104 is generally arranged for communications on a vehicle network 106 that can include a communications bus in the vehicle such as a controller area network CAN or the like, and/or other wired and/or wireless mechanisms. The vehicle network 106 is a communications network via which messages can be exchanged between various devices, e.g., sensors 108, components 110, computer 104(*s*), etc. in vehicle. The computer 104 can be generally programmed to send and/or receive, via vehicle network 106, messages to and/or from other devices in vehicle e.g., any or all of ECUs, sensors 108, actuators, components 110, communications module, a human machine interface (HMI) 112, etc. For example, various component 110 subsystems (e.g., components 110 can be controlled by respective ECUs) and/or sensors 108 may provide data to the computer 104 via the vehicle network 106.

Further, in cases in which computer 104 actually comprises a plurality of devices, the vehicle network 106 may be used for communications between devices represented as computer 104 in this disclosure. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies e.g., Ethernet, WiFi®, Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices in vehicle. For example, vehicle network 106 can include a CAN (or CAN bus) in which some devices in vehicle communicate via a CAN bus, and a wired or wireless local area network in which some device in vehicle communicate according to Ethernet or Wi-Fi communication protocols.

The vehicle 101 typically includes a variety of sensors 108. A sensor 108 is a device that can obtain one or more measurements of one or more physical phenomena. Some sensors 108 detect internal states of the vehicle, for example, wheel speed, wheel orientation, and engine and transmission variables. Some sensors 108 detect the position or orientation of the vehicle, for example, global positioning system GPS sensors 108; accelerometers such as piezo-electric or microelectromechanical systems MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Sensor 108 operation can be affected by obstructions, e.g., dust, snow, insects, etc. Often, but not necessarily, a sensor 108 includes a digital-to-analog converter to convert sensed analog data to a digital signal that can be provided to a digital computer 104, e.g., via a network.

Sensors 108 can include a variety of devices, and can be disposed to sense and environment, provide data about a machine, etc., in a variety of ways. For example, a sensor 108 could be mounted to a stationary infrastructure element on, over, or near a road. Moreover, various controllers in a vehicle may operate as sensors 108 to provide data via the vehicle network 106 or bus, e.g., data relating to vehicle speed, location, subsystem and/or component 110 status, etc. Further, other sensors 108, in or on a vehicle, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component 110, a location of an object, a speed of an object, a type of an object, a slope of a roadway, a temperature, a presence or amount of moisture, a fuel level, a data rate, etc.

The computer 104 may include programming to command one or more actuators to operate one or more vehicle subsystems or components 110, such as vehicle brakes, propulsion, or steering. That is, the computer 104 may actuate control of speed in the vehicle by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 106, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle can include an HMI 112 (human-machine interface), e.g., one or more of a display, a touchscreen display, a microphone, a speaker, etc. The user can provide input to devices such as the computer 104 via the HMI 112. The HMI 112 can communicate with the computer 104 via the vehicle network 106, e.g., the HMI 112 can send a message including the user input provided via a touchscreen, microphone, a camera that captures a gesture, etc., to a computer 104, and/or can display output, e.g., via a screen, speaker, etc. Further, operations of the HMI 112 could be performed by a portable user device (not shown) such as a smart phone or the like in communication with the vehicle computer 104, e.g., via Bluetooth or the like.

The computer 104 may be configured for communicating via a vehicle to vehicle communication module 114 or interface with devices outside of the vehicle, e.g., through a wide area network 116 and/or vehicle to vehicle V2V, vehicle-to-infrastructure or everything V2X or vehicle-to-everything including cellular communications C-V2X wireless communications cellular, DSRC, etc. to another vehicle, to an infrastructure element typically via direct radio frequency communications and/or typically via the network a remote server 118. The module could include one or more mechanisms by which the computers 104 of vehicles may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

A computer 104 can be programmed to communicate with one or more remote sites such as a remote server 118, via a wide area network 116. The wide area network 116 can include one or more mechanisms by which a vehicle computer 104 may communicate with, for example, a remote server 118. For example, a vehicle 101 could include a wireless transceiver (i.e., transmitter and/or receiver) to send and receive messages outside of the vehicle 101. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle to everything V2X such as cellular V2X CV2X, Dedicated Short Range Communications DSRC, etc., local area networks and/or wide area networks 116, including the Internet, providing data communication services.

The server 118 may include one or more computing devices, e.g., having respective processors and memories and/or associated data stores, that are accessible via the wide area network 116.

Figure 2:
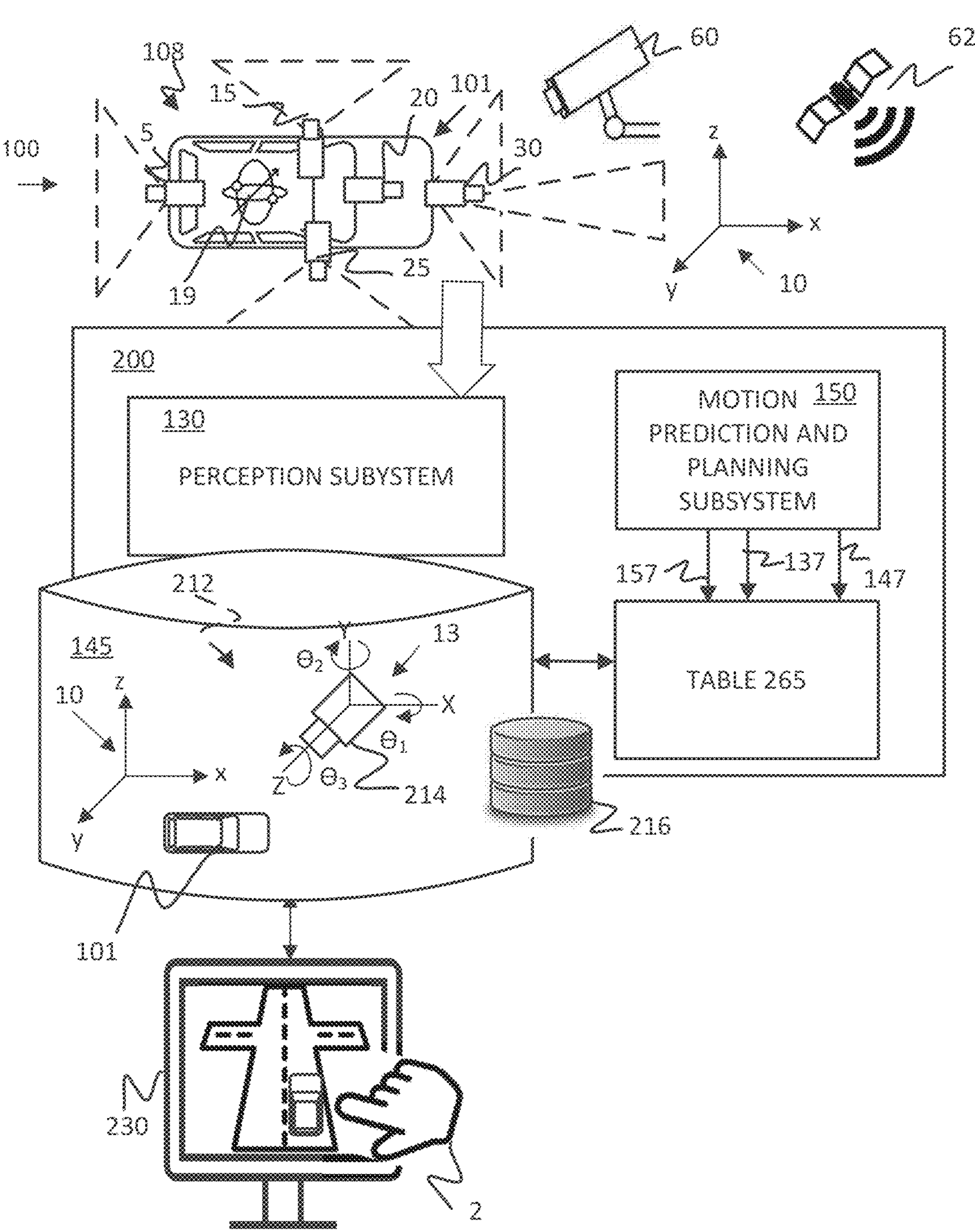
FIG. 2 is a block diagram showing further details of the vehicle system shown in FIG. 1.

FIG. 2 is a block diagram showing vehicle system 100 including an advanced driver assistance system (ADAS) 200 in an example implementation. ADAS 200 includes a vehicle perception subsystem 130 and a vehicle motion and planning subsystem 150. Vehicle motion and planning subsystem 150 provides real-time vehicle motion data 137, 147 and planned path 157.

View management and storage system 145 may implement a 3D virtual driving space 212. A virtual driving space 212 is a virtual 3D view space of the real-world 3D space surrounding a vehicle 101 that is proceeding along a path. A 'view' is an observation of the real-world space taken by a camera. The extent of the observation is determined by the FoV of the camera posed (situated in a pitch, yaw and roll) at a point in the real-world space. A point in space at which a camera is positioned and posed is a viewpoint. A view observed from a viewpoint of a physical camera can be captured by the physical camera, i.e., sensed as an image of a scene in the FoV.

'Virtual views' are views that are synthesized, constructed or otherwise derived from one or more images of one or more views of the real-world, captured by physical cameras. Views for virtual driving space 212 can be constructed from raw data provided by imaging and/or ranging sensors 108 (e.g., cameras 5, 15, 20, 25, 30 and/or radar) as well as inertial navigation system 19, map data, satellites 62, images from traffic and surveillance cameras 60, aerial drone cameras, and/or from other vehicles that may provide their sensor data.

Virtual views can also be constructed from other virtual views. For example, a single view of the real-world space can be captured by a physical camera as an image. An image processing system can process the image to project that view from the plane of camera's imager onto many different view planes, allowing the view to be rendered from many different perspectives. Thus many, e.g., thousands of different virtual views of a real-world space can be generated from a single view. Many single views can likewise be reprojected, synthesized, or otherwise combined with other views and virtual views to generate even more virtual views of the real-world space.

Every view, virtual or real, has a viewpoint whether a physical camera captured the view. Given a virtual view, a corresponding viewpoint can be estimated or 'reverse engineered', e.g., by analyzing perspective and comparing anchor points in a view to anchor points in reference views. In other words, a view that was constructed from other views, and thus not captured by a camera can be analyzed to estimate what viewpoint a camera would have had, had a camera captured that view. The estimated viewpoints are virtual viewpoints.

Figure 3:
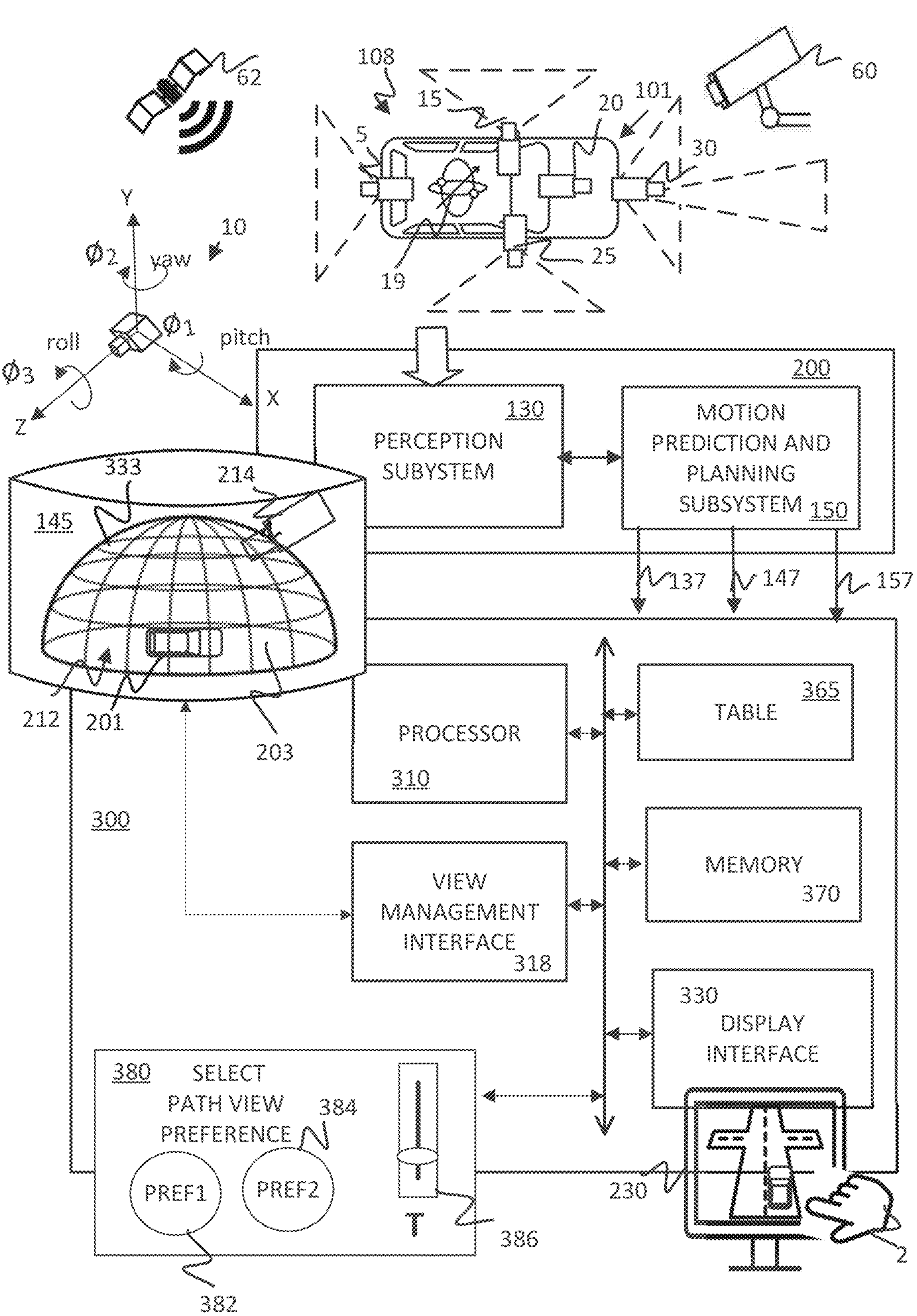
FIG. 3 is a block diagram of an adaptive optimal viewpoint selection apparatus.

Referring now to FIG. 3, in examples described herein, the real-world driving space 212 is modeled as a sphere 333 enclosing a volume of space around the vehicle. The space within the sphere 333 is represented by a collection of virtual views from many different viewpoints on the surface of the sphere 333. The reason for estimating the viewpoints of the virtual views is to determine where the virtual views fit within the spherical volume of space surrounding the vehicle 101 (defined by the sphere 333), and to be able to retrieve a view based on a viewpoint.

Views fitting within sphere 333 are stored in a data store 216 and indexed to their corresponding estimated viewpoints. The views are also processed extensively to provide 'descriptors' which describe various aspects of the views' contents. Data store 216 containing the views, together with the database(s) indexing the views by viewpoint constitute the 'virtual driving space'. A 'virtual camera' is a hypothetical camera, i.e., implemented by computer program instructions, that 'captures' a view of the virtual driving space by searching data store 216 in response to a query to retrieve a corresponding view. The virtual camera is 'positioned' at viewpoint on sphere 333 by providing the viewpoint as a search query. In other words, a virtual camera is a query system for a view storage space. The queries are expressed in terms of viewpoints.

In some situations, views with particular characteristics, rather than views from particular viewpoints are sought. For example, an ADAS 200 may specify default viewpoints. Default viewpoints are predetermined viewpoints chosen to provide views meeting general objectives in typical driving scenarios. In complex driving situations, a view from the default ADAS viewpoint may not possess characteristics that meet more specific objectives, i.e., objectives based on specific characteristics of a present driving situation, which can be more complex than the typical driving scenarios.

In those complex situations, a user might seek a better vantage point (viewpoint) from which to view the virtual driving space. For example, an ADAS 200 view rendering subsystem (not depicted) typically provides views from the default viewpoint for rendering on a display surface of display device 230. A user in this situation may not know whether there is any better vantage point, and there may not be any better vantage point than the default viewpoint. To find out, the user could try manipulating the user interface through various viewpoints to try to tune in to a 'better' view. FIG. 2 shows an ADAS 200 with a display that allows a user to manually change the virtual viewpoint by interacting with display device 230. The user may find manual searching inconvenient and time consuming which can lead to user dissatisfaction.

A processor might conduct a search of the virtual driving space by supplying successive respective viewpoints as queries and evaluating corresponding respective successive views on criteria defining 'better', until a view meeting the criteria is retrieved. Even then, the processor would not know if some other view in the virtual driving space meets the criteria to a greater extent than the retrieved view. To find that out, the processor would have to evaluate views from every viewpoint on the sphere 333. This kind of exhaustive search consumes time and processing resources and is incompatible with real time demands of ADAS applications.

The disclosure provides systems and methods for searching for optimal viewpoints in an efficient manner to diminish expenditure of time and/or resources in a search for a better view. Whether a candidate optimal viewpoint is an optimal viewpoint is determined by comparing the extent to which a view from the candidate optimal viewpoint meets the criteria, to the extent to which the view from the default viewpoint meets the criteria. Of the two views, the one meeting the criteria to a greater extent than the other is the optimal view, and its viewpoint is an optimal viewpoint.

The disclosure provides apparatus and methods by which a user can adjust the criteria defining a 'better' view. In a first approach the user can select which of two extremes in a measurable path characteristic the user prefers to use to identify an optimal view, the highest measurement (maximum) or the lowest measurement (minimum) The apparatus identifies an optimal view by finding a maximum or a minimum function output based on which of the minimum or the maximum is selected. In a second approach the user can tune the search to favor views based on complexity (or immediacy) of a views' content by changing a value of a hyperparameter (time) that determines to what extent a view's content represents events likely to occur relative soon versus relatively distant (future) events and scores the view accordingly.

Camera viewpoints are typically defined according to a camera coordinate system 13. A viewpoint is specified by both a point and a view from that point. A "camera viewpoint" herein means a spatial position (x, y, z) and a spatial orientation ($\theta_1$, $\theta_2$, $\theta_3$) (pitch, yaw, roll) of a camera. View management and storage system 145 can apply conventional techniques to translate coordinates from a camera coordinate system 13 to a real-world coordinate system 10, and vice versa. A viewpoint for virtual camera 214 is specified by a position specified by x, y, z coordinates, which can be in coordinate system 10 of virtual driving space 212. Coordinate system 10 of virtual driving space 212 can correspond to coordinate system 10 in a real-world driving space. A viewpoint is typically further specified by a pitch $\theta_1$, a yaw $\theta_2$, and a roll $\theta_3$ of a camera with respect x, y and z axes in which its position is given.

Table I below shows an example portion of a data set 265 in the form of a table that provides vehicle operation data sets which are sets of specified values of vehicle motion and path parameters. Each data set defines a driving scenario. Table I can be used by the ADAS to determine a default viewpoint. Example driving scenarios A-D are defined by corresponding respective sets of motion and path parameter values and a respective corresponding default viewpoint for virtual camera 214. Vehicle system 100 compares received real-time motion data sets 137, 147, and planned path data set 157 to the corresponding scenario motion data sets 137, 147 and planned path data set 157 to determine which default viewpoint the vehicle will use. Vehicle system provides the default viewpoint specified by a data set in scenario data set 265 to virtual camera 214 corresponding to the identified scenario.

TABLE I

| MOTION DATA | | | | DEFAULT VIEWPOINT | |
|---|---|---|---|---|---|
| Scenario | Vehicle Speed Range | Planned Path | Planned speed | $P_{(x, y, z)}$ | $\Theta_1\Theta_2\Theta_3$ |
| A | <25 MPH | Straight | <25 MPH | (−6, 0, 6) | (0, 45°, 0) |
| B | 25 MPH < X < 55 MPH | Straight | 25 MPH < X < 55 MPH | (−10, 0, 8) | (0, 30°, 0) |
| C | >55 MPH | Straight | >55 MPH | (−8, 0, 6) | (0, 25°, 0) |
| D | <5 MPH | Standard Right turn | 25 MPH < X < 55 MPH | (−10, −8, 8) | (0, 35°, 75°) |

For example, scenario A is defined by a range of vehicle speeds 137 less than 25 MPH, a straight planned path 157, and a planned speed 147 less than 25 MPH. In this scenario the default viewpoint for virtual camera 214 is defined by an x, y, z position (−6, 0, −6) and orientation (pitch, yaw, roll) of: $\theta_1$ (0), $\theta_2$) (45°), $\theta_3$(0).

Scenario B is defined by a range of vehicle speeds 137 greater than 25 MPH and less than 55 MPH, a straight planned path 157, and a planned vehicle speed 147 greater than 25 MPH and less than 55 MPH. In this scenario the default viewpoint for virtual camera 214 is defined by a position (−10, 0, 8) and orientation of: $\theta_1$ (0), $\theta_2$ (30°), $\theta_3$(0).

Scenario C is defined by a range of vehicle speeds 137 greater than 55 MPH, a straight planned path 157 and a planned speed 147 greater than 55 MPH. In this scenario the default viewpoint for virtual camera 214 is defined by a position (−8, 0, 6) and orientation (pitch, yaw, roll) of: $\theta_1$ (0), $\theta_2$ (25°), $\theta_3$(0).

Scenario D specifies a range of speeds less than 5 MPH, which could correspond to a vehicle slowing down to make the specified standard right turn in its planned path, after which the vehicle motion plan calls for a range of speeds between 25 MPH and 44 MPH. In this scenario the default virtual camera viewpoint is defined by a position (−10, −8, 8) and orientation (pitch, yaw, roll) of: $\theta_1$ (0), $\theta_2$ (35°), $\theta_3$(75).

FIG. 3 is a block diagram of an apparatus 300 for viewpoint selection and automatic viewpoint switching. Apparatus 300 comprises a memory 370, a data set 365 a processor 310, a view management interface 318, a display interface 330 and a user interface 380. Memory 370 stores processor executable instructions that configure processor 310 to perform methods, processes and functions including as described herein.

Processor 310 is configured to communicate with view management and storage system 145 via virtual camera 214 to retrieve views of virtual driving space 212 by providing virtual camera viewpoints to virtual camera 214. Virtual camera 214 'captures' an image from virtual driving space 212 and provides it to processor 310 or to display interface 330 for rendering on display device 230. Apparatus 300 is further configured to render views on a transparent display of a head up display (HUD) (not depicted) of vehicle 101.

As stated above, a viewpoint is specified by both a point and a view from that point. For a viewpoint of a virtual camera, the point is given as a position of the virtual camera with respect to a point (x, y, z) on a surface of a grid defining virtual sphere 333. In this context a 'view' of a virtual camera is an area (typically conic) of a ground plane 203 that is coextensive with a field of view (FoV) of the virtual camera. The FoV of the virtual camera is the horizontal and vertical spatial extent of the virtual camera's virtual imager at a given distance from the ground plane 203 along the optical axis of the camera. To facilitate description of the subject matter, example virtual camera 214 is considered to have a fixed FoV, although virtual cameras that do not have fixed FoV are suitable for use in the disclosed examples.

A 'view' from the specified point is given as an angular spatial orientation of the virtual camera with six degrees of freedom of motion (yaw, pitch, roll) with respect to its optical axis. When the optical axis is directed toward the ground plane 203, the camera's FoV defines an angular extent (or conic section) of the ground plane that can be imaged by the camera with respect to the intersection of the optical axis with the ground plane. Targets on the ground plane 203 are in a view captured by the camera if they are within the camera's field of view (FoV). A ground plane 203 is a 2D plane in virtual driving space 212 that represents the earth's surface over region small enough to have negligible curvature.

The term 'optimal' herein means optimal or preferred with reference to a set of available alternatives. An optimal viewpoint is a preferred viewpoint (i.e., a viewpoint that meets defined criteria to a greater extent than alternatives).

As described above, view management interface 318 queries virtual driving space 212 by providing viewpoints to virtual camera 214. Processor 310 can identify a default viewpoint based on motion data 137, 147 and planned path 157. Processor 310 can provide the default viewpoint to view management interface 318. View management interface 318 can search virtual driving space 212 for the default view by providing the default viewpoint to virtual camera 214. The default views may be rendered on display device 230. Processor 310 is configured to evaluate the default views retrieved by view management interface 318 to determine if the default views are optimal to meet specified objectives. Processor 310 is further configured to receive signals indicating view preferences of a user via display interface 330.

Processor 310 is configured to receive motion data 137, 147 and planned path 157 from vehicle system 100 as vehicle 101 moves along its planned path. Processor 310 uses the motion data 137, 147 and planned path 157 to identify the default viewpoint that will be used by view management interface 318 to retrieve views for rendering on display device 230. Processor 310 obtains the default view, or a description of the default view based on the default viewpoint.

Table II shows data sets 365 that can be stored in tabular form, e.g., provided below is a scenario table that maps respective driving scenarios to corresponding respective default viewpoints. Data sets 365 in part duplicate the data sets 265 (see Table I above).

Processor 310 uses the data sets 365 to identify a current default viewpoint by comparing values specified as real-time motion data 137, 147 and values specified as planned path 157 data, to the values specified as motion data and planned path data in each of the scenarios in data set 365. Processor 310 looks up the default viewpoint corresponding to the identified scenario.

In addition, processor 310 can look up any corresponding viewpoint constraints as well as a default tuning value T from the scenario data sets 365. These data are not included in the data sets 265 of view management interface 318.

Tuning value T can be implemented in one of at least three different ways. For example, tuning value T can be implemented as a hyperparameter, a penalty or a threshold depending on specifics of the application.

A hyperparameter is a parameter whose value controls (tunes) performance of the search for an optimal viewpoint. While a hyperparameter value itself cannot be learned, what a given user considers 'optimal performance' of apparatus 300 can be learned and this can be correlated to a hyperparameter value, which can then be set for a given user. A penalty function imposes a penalty on a view that violates a constraint such as a constraint on view complexity C. A threshold is magnitude that must be exceeded before a default viewpoint can be switched to an alternative viewpoint.

As shown in FIG. 3 apparatus 300 includes a user interface 380. User interface 380 includes a control for adjusting tuning value T (386) and a control for selecting path view preference, either PREF1 at 382 or PREF2 at 384, where PREF1 expresses a preference for viewing a highest resistance path and PREF2 expresses a preference for viewing a lowest resistance path. For purposes of this specification 'path resistance' is a quality of a vehicle path that would tend to oppose vehicle 101 proceeding along the path due resistance from obstacles such as other vehicles intercepting a part of the planned path at a time vehicle 101 expects to intercept that part of the planned path, such that vehicle 101 may be blocked from proceeding.

For example, at an intersection at which vehicle 101 plans to make a left turn across two lanes of traffic, a view of the intersection looking out from the driver's left side window shows objects that are oncoming, i.e., moving along a path (lane) toward vehicle 101. A view of the intersection looking out from the driver's right-side window shows objects that are moving along a path (lane) away from vehicle 101. The objects moving toward vehicle 101 are potential interceptors of vehicle 101, should vehicle 101 proceed into the intersection, no matter which path the vehicle might take. The objects moving away from vehicle 101 are not potential interceptors of vehicle 101 should vehicle 101 proceed into the intersection, no matter which path the vehicle might take.

Thus, the path (lane) along which vehicles are traveling toward vehicle 101 is a high-resistance path (with respect to the vehicle moving into the intersection). The path (lane) along which vehicles are traveling away from vehicle 101 is a low resistance path (with respect to the vehicle moving into the intersection). In this situation, some users may prefer a view of the path with the oncoming objects, i.e., the

TABLE II

| | MOTION DATA | | | DEFAULT VIEWPOINT | | | |
|---|---|---|---|---|---|---|---|
| Scenario | Vehicle Speed | Future Path | Future motion plan speed | (x, y, z) camera position (fixed FOV camera) | (Yaw, pitch, roll) | CONSTRAINT Max Yaw | TUNE T |
| A | <25 MPH | Straight | <25 MPH | (−6, 0, 6) | (0, 45°, 0) | <\|5\| | 10 |
| B | 25 MPH < X < 55 MPH | Straight | 25 MPH < X < 55 MPH | (−10, 0, 8) | (0, 30°, 0) | <\|5\| | 8 |
| C | >55 MPH | Straight | >55 MPH | (−8, 0, 6) | (0, 25°, 0) | <\|5\| | 12 |
| D | <5 MPH | Standard Right turn | 25 MPH < X < 55 MPH | (−10, −8, 8) | (0, 35°, 75°) | | 5 |

path of highest resistance. Other users may prefer a view of the path of least resistance, e.g., when considering a right turn onto one lane instead of waiting for traffic to decrease before crossing two lanes.

In some implementations, controls 382, 384, 386 may be software implemented. In those implementations, a user's preference for one type of view over another may be learned by recording the user's interactions with views on a display device views over time and analyzing the interactions using a suitable technique. T may thus be dynamically adjusted based on learned data gathered over time. A user's preference to optimize the optimal viewpoint selection process by preferring views with minima (lowest numbers of minTTI objects, i.e., PREF1) or maxima (highest numbers of minTTI objects, i.e., PREF2) can also be learned by observing the viewer's response to rendered views. In other implementations, the settings may be adjusted rapidly in response to particular situations.

Figure 4A:
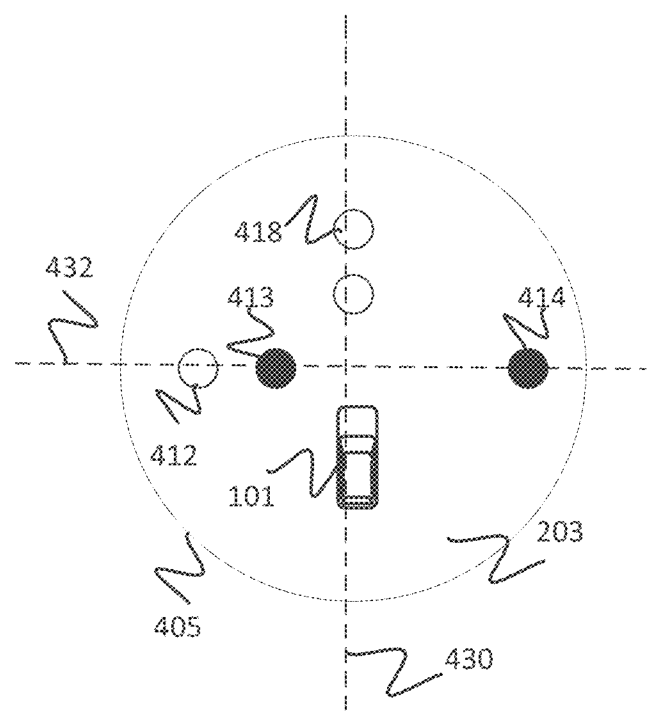
FIG. 4A is a top orthographic view of ground plane of 3D virtual driving space.

FIG. 4A is a top orthographic view of ground plane of 3D virtual driving space 212. In one example implementation this is an orthographic bird's eye view (BEV). A BEV shows positions of objects within a 360-degree radius of vehicle 101 as dots, e.g., observation objects 412, 413, 418, 414, and can also show paths, e.g., 430, 432 taken by the objects to reach their present positions. An orthographic bird's eye view is a view of a scene projected onto a plane in which the lines of projection can be considered perpendicular to the plane.

A BEV can be constructed by extracting features from views provided by imaging sensors 108 and fusing them with point clouds from ranging sensors. For example, Red, Green, Blue (RGB) pixel data from an imaging sensor can be fused with LiDAR point clouds and the fused data can be transformed to an orthographic BEV.

Aggregated point clouds in BEV can be evaluated with respect to motion of vehicle 101 in a real-world driving space, moving objects such as vehicles and pedestrians typically can be described as moving along two orthogonal axes, e.g., of a coordinate system described for a vehicle 101: parallel to vehicle 101 as indicated at 430, or perpendicular to it such as at an intersection, as indicated at 432.

Figure 4B:
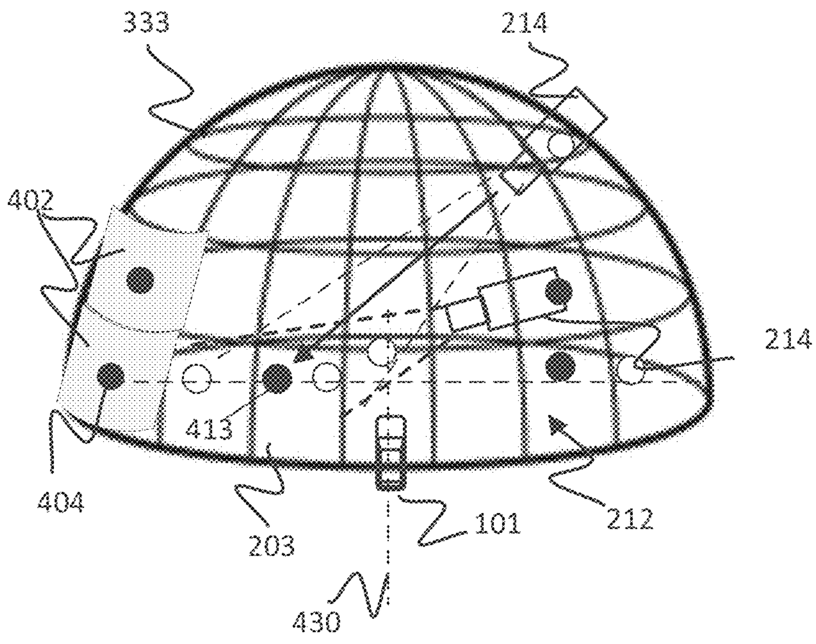
FIG. 4B is a diagram of a 3D virtual driving space including a spherical grid dividing the space into faces.

FIG. 4B is a diagram of a 3D virtual driving space including a sphere 333 whose surface is portioned into faces 402 by a grid. The center 404 of each face is a position (x, y, z) for virtual camera 214. Processor 310 may adjust the number of faces by adjusting the grid to provide more, or fewer faces 402.

Figure 4C:
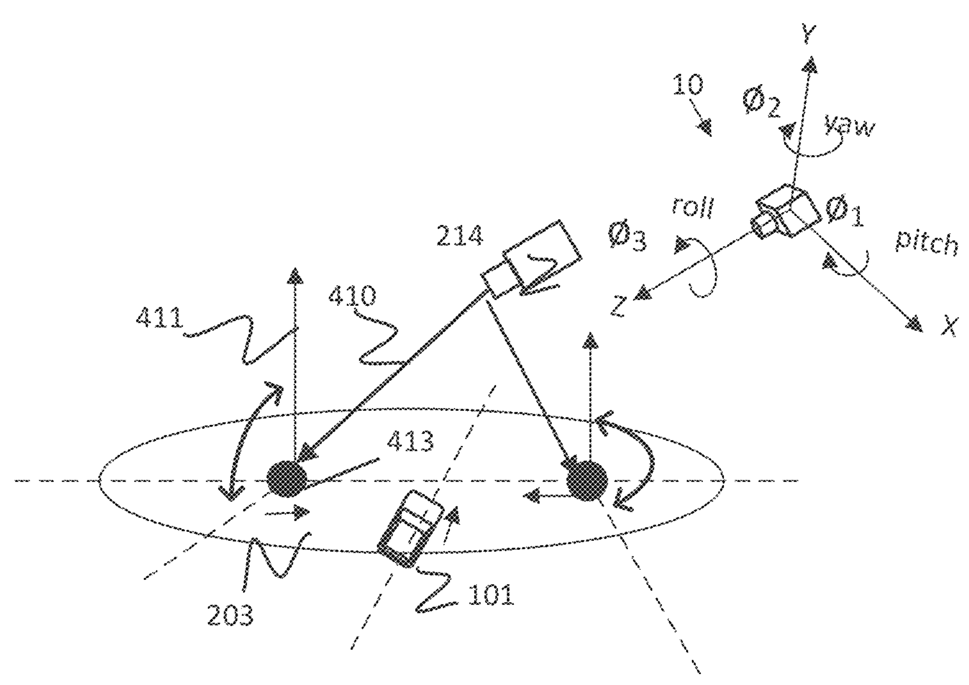
FIG. 4C is a diagram illustrating construction of a viewpoint vector.

FIG. 4C is a perspective view of the ground plane shown in FIG. 4A showing construction of a viewpoint vector. A viewpoint vector is a vector defining a camera viewpoint, i.e., a vector extending from a center position of a face to a position on the ground plane, e.g., a position of an object on the ground plane. From a viewpoint defined by a viewpoint vector 410, an observed object, e.g., 413 on ground plane 203 is within the FoV of virtual camera 214 if the dot product of its normal 411 and the viewing direction of virtual camera 214 is negative. The viewpoint is scored by evaluating the view based on numbers of observed objects within the FoV that fit a time criterion.

Figure 4D:
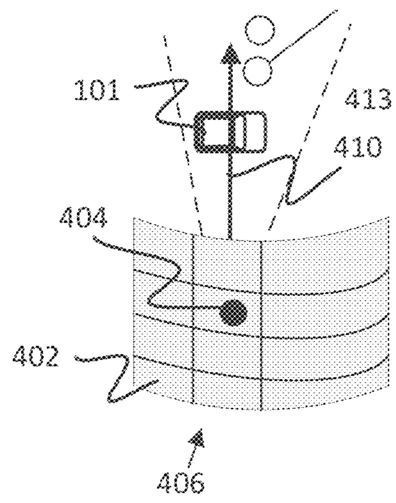
FIG. 4D is a diagram illustrating a region of the spherical grid of FIG. 4B.

FIG. 4D shows a region 406 of sphere 333. In some implementations, processor 310 selects regions of sphere 333 based on traffic patterns and path layout in the top-down view, e.g., at 405 of FIG. 4A. The selection of regions based on traffic patterns (which are typically defined by orthogonal paths) constrains the number of faces of sphere 333 that could provide optimal viewpoints, since a view from an optimal viewpoint will include objects moving along at least one of the paths defined by the traffic patterns. One region 406 comprises faces 402. To perform a grid search, processor 310 positions virtual camera 214 (not visible) at a center 404 of a face 402 of a region 406. Yaw, pitch and roll can be determined by constructing viewpoint vectors as described herein. Once the viewpoint is given, a field of view determines what objects, e.g., 101, 413 will be within the field of view FoV of virtual camera 214.

Figure 5:
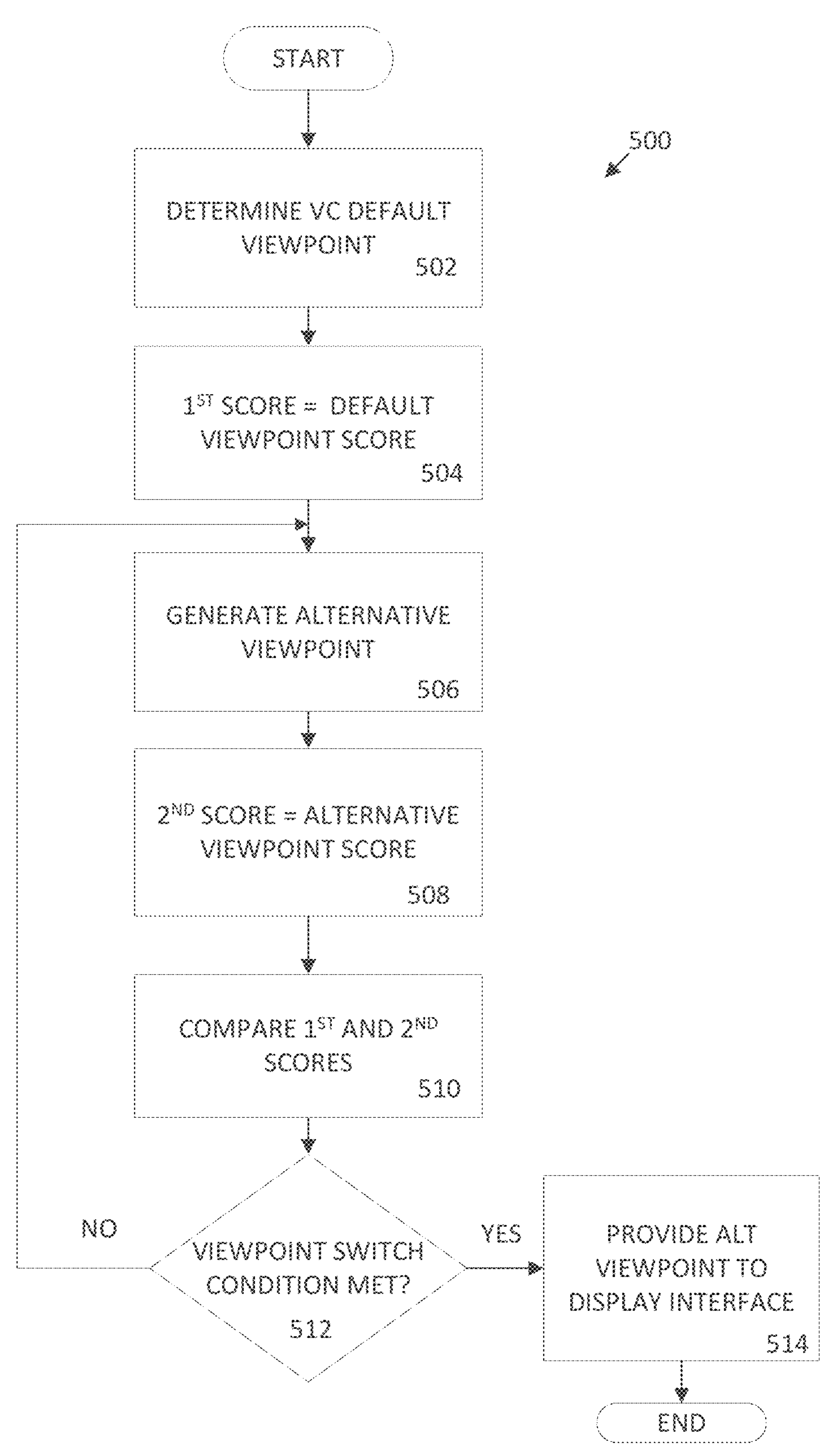
FIG. 5 is a flowchart of a method for identifying an optimal viewpoint.

FIG. 5 is a flowchart of a method 500 for adaptive optimal viewpoint switching. At block 502 processor 310 determines a virtual camera default viewpoint, e.g., using Table II as described above.

At block 504 processor 310 retrieves a view from the virtual camera 214 default viewpoint and evaluates a function to determine the extent to which the view meets criteria. In other words, the function scores the view. The view is scored as a function of motion parameters of objects in the default view. A first example motion parameter is Time-to-Intercept (TTI). TTI is defined as the time it takes an object on a path to intercept the path of vehicle 101, to travel from its current position to the interception point assuming the speeds and paths of the object and vehicle 101 do not change. A procedure to calculate the time-to-intercept considers the initial positions of the object and vehicle 101 and their speeds and directions of travel. The intersection point is given by the following expressions:

$$x_+ = \frac{(y_2 - y_1) - (x_2 \cdot \tan\theta_2 - x_1 \cdot \tan\theta_1)}{\tan\theta_1 - \tan\theta_2} \tag{1}$$

$$y_+ = \frac{(x_2 - x_1) - (y_2 \cdot \cot\theta_2 - y_1 \cdot \cot\theta_1)}{\cot\theta_1 - \cot\theta_2} \tag{2}$$

Time remaining for an object to reach the interception point with vehicle 101 is calculated based on eq. 1 and 2. Processor 310 computes a TTI for every object in the default view. Of all the computed TTI for the view, processor 310 identifies the lowest TTI. This is 'minTTI' which is the second motion parameter. Processor 310 scores the default view on a first criterion, which is a function of the first and second motion parameters, in this example a percentage of the objects in the view whose TTI=minTTI:

$$f_{minTTI}(x, y, z, \text{yaw, pitch, roll}) = \#\min TTI \text{ objects}/\#TTI \text{ objects} \tag{3}$$

Processor 310 may also evaluate the view on a second objective criterion which is a function of the first motion parameter:

$$C(x, y, z, \text{yaw, pitch, roll}) = \#TTI \text{ objects} \tag{4}$$

The scores on the first and second criterion can be combined to provide the first score, which is the default view score.

$$S = f\min TTI(x, y, z, \text{yaw, pitch, roll}) + C(x, y, z, \text{yaw, pitch, roll}) \tag{5}$$

At block 506 processor 310 generates an alternative virtual camera viewpoint by constructing a viewpoint vector as shown in FIG. 4C.

At block 508 processor 310 retrieves and scores a view from the alternative virtual camera viewpoint on the same objective criteria and motion parameters by which the default view was evaluated. The score on the first objective criterion is given by:

$$f\min TTI(x, y, z, \text{yaw}, \text{pitch}, \text{roll}) = \#\min TTI\ \text{objects}/\#TTI\ \text{objects} \quad (6)$$

Processor 310 can also evaluate the view on the second objective criterion:

$$C(x, y, z, \text{yaw}, \text{pitch}, \text{roll}) = \#TTI\ \text{objects} \quad (7)$$

Processor 310 can combine the first and second criterion scores for the alternative viewpoint to provide the second score, which is the alternative view score:

$$S = f\min TTI(x, y, z, \text{yaw}, \text{pitch}, \text{roll}) + C(x, y, z, \text{yaw}, \text{pitch}, \text{roll}) \quad (8)$$

At block 510 processor 310 evaluates a viewpoint switching condition that compares the first and second scores:

$$f_{minTTI}(x, y, z, \text{yaw}, \text{pitch}, \text{roll}) + C(x, y, z, \text{yaw}, \text{pitch}, \text{roll}) > f_{default}(\ \dots\ ) + T + C(\ \dots\ ) \quad (9)$$

The viewpoint switching condition specifies a condition as an inequality that must be met before a viewpoint can be switched from a default viewpoint to an alternative viewpoint.

At block 512 processor 310 determines whether the viewpoint switching condition is met. In implementations in which tuning value T is a threshold, the viewpoint switching condition is met if the second score is greater than the first score by an amount that exceeds threshold T.

If the viewpoint switching condition is met, processor 310 provides the alternative viewpoint to display interface 330 for rendering views from the alternative viewpoint on display 230.

If the viewpoint switch condition is not met, processor 310 returns to block 506 and generates another alternative viewpoint. Processor 310 repeats blocks 506 to 512 until the viewpoint switching condition is met at block 512. In that case, at block 514 processor 310 provides the alternative virtual camera viewpoint to display interface 330, whereupon display device 230 renders views of the driving environment from the alternative viewpoint.

As a threshold value, tuning value T influences how many iterations of blocks 506 to 512 will be performed before a viewpoint switching condition is met. For example, if T is set relatively high, an alternative view score must exceed the default view score by that high value. In other words, the bar is set high for the alternative viewpoint to meet the switching condition. This means processor 310 may have to evaluate many alternative viewpoints to find one that provides a view with a sufficiently high score to exceed the default view score plus the threshold value. This can cause wait times as apparatus 300 cycles through blocks 506 to 512 looking for a viewpoint that provides a view with a sufficiently high score.

On the other hand, if T is set very low, a view from an alternative viewpoint need not exceed the default view score by very much in order to satisfy the viewpoint switching condition. However, in that case the alternative view that satisfies the condition may not be very much better than the default view. A user can adjust control 386 to find their preferred balance between significantly better views with longer execution times and shorter execution times with only slightly better views.

Figure 6:
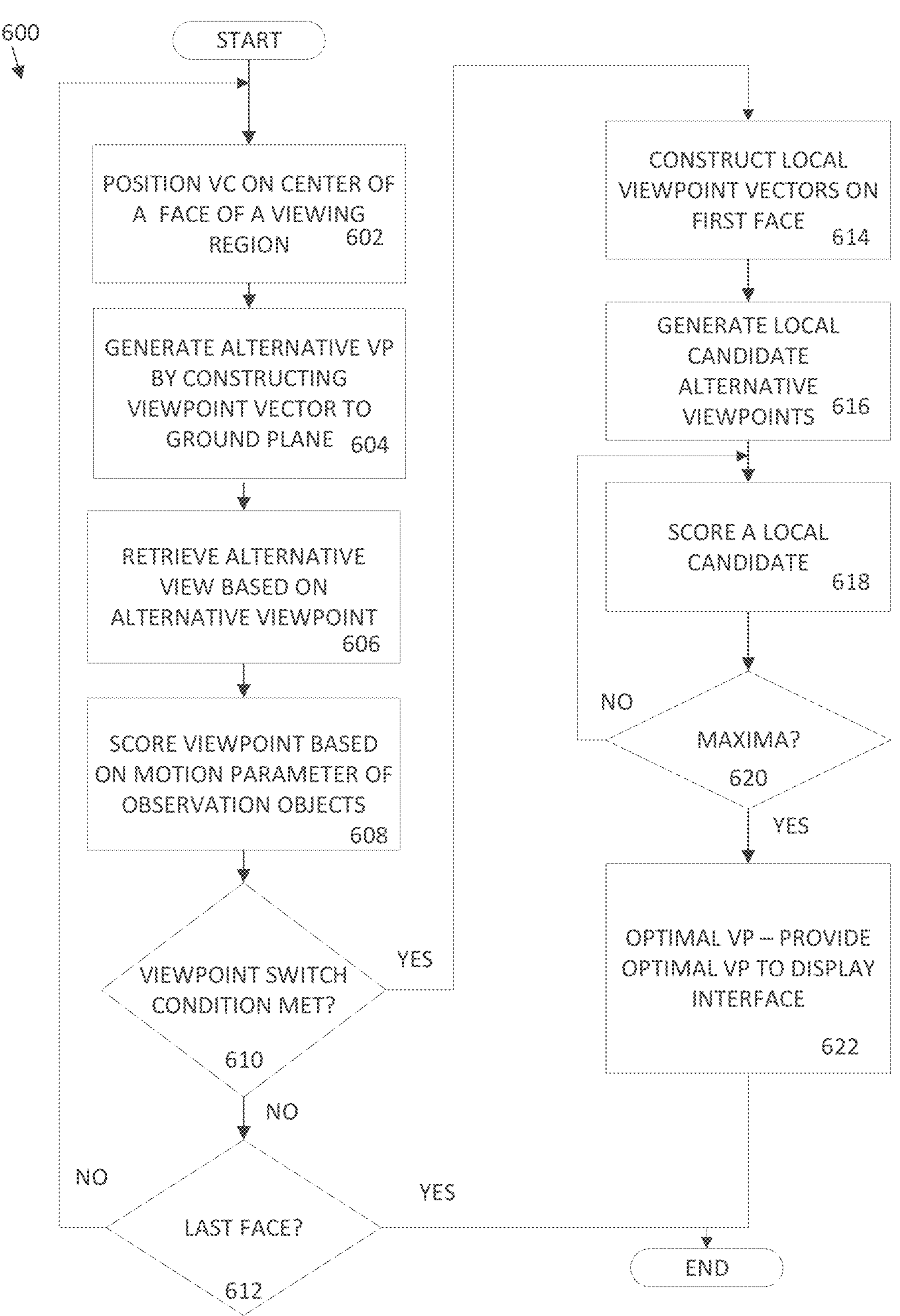
FIG. 6 is a flowchart of a method for identifying an optimal viewpoint.

FIG. 6 is a flowchart of a method 600 for finding an optimal alternative to the default viewpoint.

At block 602 processor 310 positions virtual camera 214 at a center point 404 of a first face 402 of virtual sphere 333. In an example implementation, a viewing region 406 of sphere 333 that is well situated to provide a candidate alternative viewpoint is identified based on traffic patterns observed in the top down view as described above with respect to FIG. 4A. For example, a viewing region that gives virtual camera 214 views of objects moving along a path toward vehicle 101 is better suited for searching an alternative viewpoint than a viewing region that does not give virtual camera 214 views of any path, or only partial views of a path.

At block 604 processor 310 generates an alternative viewpoint by constructing a viewpoint vector from the center point 404 to a position of the vehicle on the ground plane as illustrated in FIG. 4C. In some implementations, the position of the vehicle on the ground plane can be received from vehicle motion prediction and path planning subsystem 150. In other implementations the view of the ground plane, or another descriptor source may provide object descriptors that give positions of objects on the ground plane, including the position of vehicle 101.

At block 606 processor 310 retrieves a view of virtual driving space 212 by providing the alternative viewpoint to virtual camera 214.

At block 608, processor 310 scores the alternative view based on the values of motion parameters of objects in the alternative view:

$$\#\min TTI\ \text{objects}/\#TTI\ \text{objects}+\#TTI \quad (10)$$

At block 610, processor 310 evaluates a viewpoint switching condition based on the alternative view score and the default view score. If the viewpoint switching condition is not met, processor 310 proceeds to a block 612 to determine if a last face of the sphere 33 has been evaluated, and if not, returns to block 602 and selects another center 404 of a next face 402 in region 406. Otherwise, the method 600 ends.

If the viewpoint switching condition is met in the block 610, processor proceeds to block 614.

At block 614 processor 310 constructs local viewpoint vectors around the center of the face, wherein 'local' means on the same face as the viewpoint that met the viewpoint switching condition.

At block 616 processor 310 generates local candidate alternative viewpoints based on the local candidate alternative viewpoint vectors. The goal is to move the virtual camera around the face, evaluating scores to find a local maxima, i.e., a point at which the score reaches a peak and then drops on the next point.

At block 618 processor 310 scores a view from a local candidate alternative viewpoint.

At block 620 processor 310 determines whether the score is a local maximum. If so, the local candidate alternative viewpoint is identified as the optimal viewpoint.

In that case, at block 622 processor 310 provides the optimal viewpoint to display interface 230 and the method ends. Thereafter, display 230 renders views from the alternative viewpoint (optimal viewpoint).

If the viewpoint switching condition is not met, processor 310 proceeds to block 612. At block 612 processor 310 determines whether the face is the last face in viewing region. If not, processor 310 returns to block 602 and positions the virtual camera at a center of a next face of the viewing region to generate another alternative viewpoint. The method repeats until an alternative viewpoint meets the viewpoint switching criteria at block 610, or the method reaches the last face at block 612. In that case the method may end after completing a search of a selected region. This search constrained to a region may be useful when the vehicle is traveling along a highway with relatively few or no intersections and the area of interest with respect to other objects is constrained, e.g., to one side of the vehicle.

In some implementations, e.g., in an urban setting with many intersections and/or complex traffic patterns the area of interest with respect to other objects includes both sides of the vehicle and could include the rear of the vehicle, a global search, i.e., region to region would be useful. In that case the method could select a face on another viewing region and repeat according to method 700 illustrated in FIG. 7.

In some implementations tuning parameter T is a hyperparameter. For example, values of T may be expressed in units of seconds. Adjusting T sets a cut off as to how many seconds into the future a minTTI can be for objects in the view, without excluding that view from consideration. As an extreme example, if the least time remaining to interception (minTTI) of any object in a first view is, e.g., 1 hour (3600 seconds)—and there are two objects in that view with the minTTI and two other objects, the score could be 0.5 (2/4). If the minTTI in a second view is 2 seconds, and there is one object with minTTI and three other objects with TTI greater than minTTI, the score for the second view could be (1/4) 0.25. In that case, the first view would score higher than the second view and thus the first view would 'win' in a search for highest scoring view. Setting T to 30 seconds (minTTI in a view cannot be greater than 30 seconds) would exclude the first view from consideration by the scoring function because its minTTI is greater than 30 seconds. The second view would be considered because its minTTI is less than 30 seconds. The higher the time setting the more views will be considered, the longer the scoring function will take to execute. This will also tend to produce views with higher object counts. On the other hand, the lower the time setting the quicker the scoring function will execute. This will tend to produce views with lower object counts. Setting the hyperparameter value can tune the search to strike a balance according to user preference and/or a software selected balance.

Figure 7:
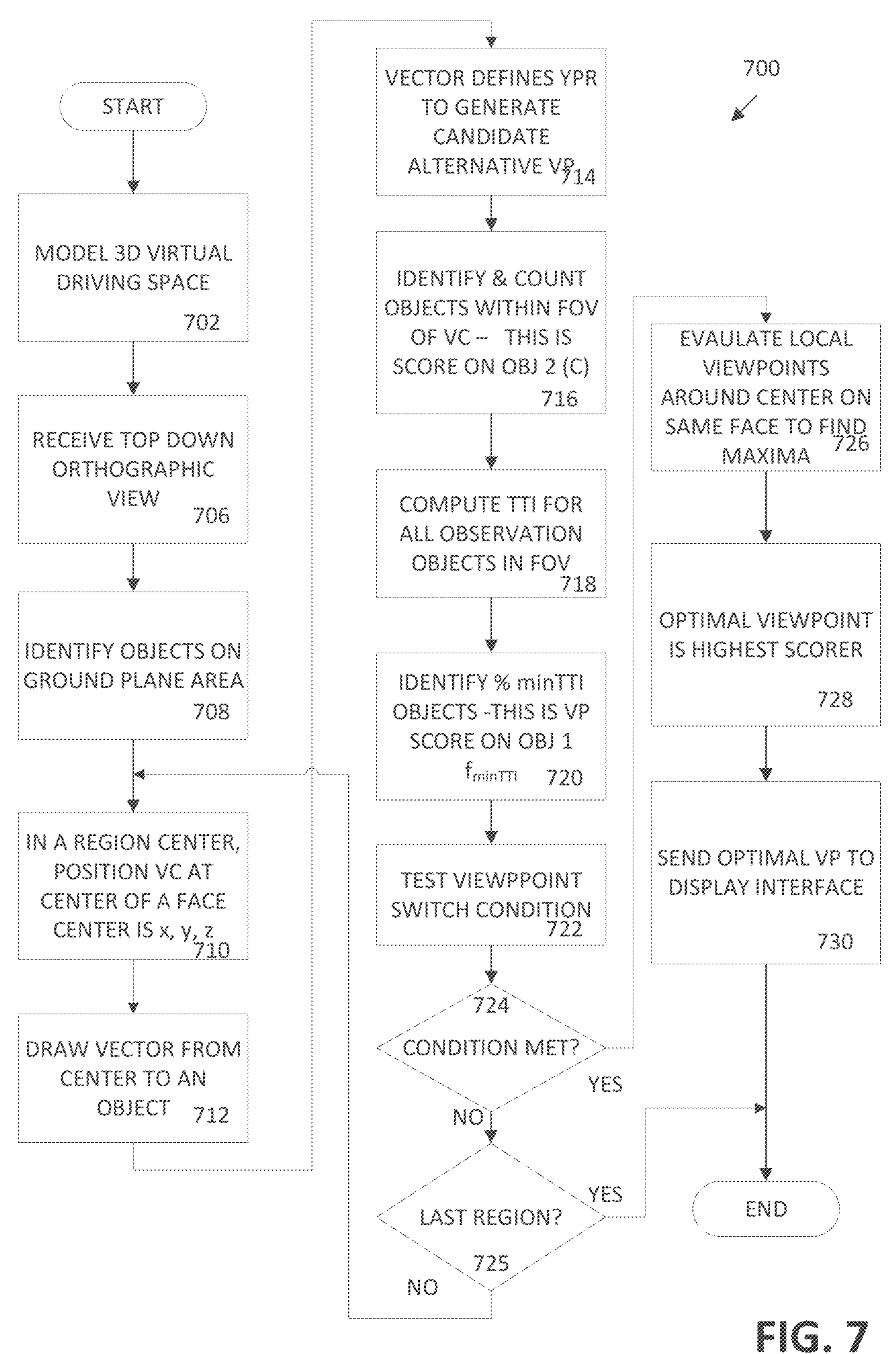
FIG. 7 is a flowchart of a method for scoring a view to determine an optimal viewpoint.

FIG. 7 is a flowchart of a method 700 for identifying an optimal viewpoint.

At block 702 processor 310 models virtual driving space 212 as a virtual sphere 333.

At block 706 processor 310 receives a top orthographic (or 'plan') view 405 of a 2D ground plane 203 of a real-world driving space including vehicle 101.

An example of a suitable top orthographic view is a bird's eye view corrected for lens distortion. A top plan view could also be provided by a ranging sensor such as a Lidar sensor, or by a combination of a ranging sensor and an imaging sensor.

At block 708 processor 310 evaluates top plan view 405 to identify objects on the ground plane to be observed, referred to herein as 'observation objects', e.g., objects 412, 413, 414 and 418. Observation objects 412, 413, 414, 418 may be vehicles, pedestrians, motorcycles, bicycles, or other objects including vehicle 101, detected in raw images captured by physical sensors, e.g., imaging and/or ranging sensors 108. Analysis of the images identified the objects as moving in the real-world driving space of vehicle 101 along a path, e.g., path 432 that intersects a path, e.g., path 430 of vehicle 101.

At block 710 processor 310 positions virtual camera 214 at a center 404 of a face 402. This defines a position (x, y, z) for virtual camera 214. A virtual camera position only partially defines a viewpoint because an unconstrained camera at a given position in space has 6 degrees of freedom of movement as illustrated in FIG. 4C at 10. At position 404 alone there could be thousands of candidate alternative viewpoints or more depending on a chosen resolution. processor 310 'point' the camera in a direction of the view to be captured.

Rather than evaluate views from every possible combination of yaw, pitch and roll at position 404, at block 712 processor 310 constructs a viewpoint vector 410 extending from point 404 to an observation object, e.g., object 413, as illustrated in FIGS. 4A-4D. The vector defines a yaw, a pitch and a roll for virtual camera 214. The combination of position (x, y, z) and the yaw, pitch, roll specifies a candidate alternative viewpoint for virtual camera 214.

At block 714 processor 310 generates the candidate alternative viewpoint based on the viewpoint vector.

At 716, processor 310 identifies all observation objects with the FoV of virtual camera 214 from the candidate alternative viewpoint (best illustrated in FIG. 4B). Processor 310 obtains a count of the observation objects within the FoV. In an example implementation the count is a second score.

At 718 processor 310 computes a time to intercept (TTI) for each observation object in the FoV.

At block 720 processor 310 identifies the lowest of the TTIs computed at block 718. The lowest TTI is referred to herein as 'minTTI'. Processor 310 determines a percentage of the observation objects in the FoV whose TTI=minTTI. In other words, processor 310 computes #minTTI observation objects/#TTI observation objects. This number is a first score on a first candidate alternative viewpoint criterion ($f_{minTTI}$).

At block 722 processor 310 tests the viewpoint switch condition based on the first and second scores.

At block 724 processor 310 determines whether the viewpoint switching condition is met. The determination at block 724 is made by testing the candidate alternative viewpoint to determine if the viewpoint switching condition is met. The viewpoint switching condition is given by:

$$f_{minTTI}(x, y, z, \text{yaw}, \text{pitch}, \text{roll}) + C(x, y, z, \text{yaw}, \text{pitch}, \text{roll}) > f_{default}(\ \dots\ ) + T + C(\ \dots\ ) \quad (12)$$

where $f_{minTTI}$ (x, y, z, yaw, pitch, roll) is the function that outputs the first score and C(x, y, z, yaw, pitch, roll) is the function that outputs the second score for the candidate alternative viewpoint and $f_{default}(\ldots)$+T+C( . . . ) evaluates a default viewpoint on the same functional criteria applied to the candidate alternative viewpoint and also considers a tuning value T.

Since the default viewpoint is known, processor 310 does not construct a viewpoint vector for the default viewpoint. Processor 310 places virtual camera 214 at a position on sphere 333 corresponding to the known default viewpoint. Processor 310 performs block 716 to block 720 with virtual camera 214 positioned at the default viewpoint to compute the first and second scores for the default viewpoint.

To evaluate the condition processor 310 determines whether the sum of the first and second scores for the candidate alternative viewpoint exceeds the sum of the first and second scores for the default viewpoint by an amount given by T.

If the viewpoint switching condition is not met, processor 310 proceeds to block 725. At block 725 processor 310 determines whether this is the last region to be evaluated. If it is, the method ends.

If not processor 310 returns to block 710 and generates another candidate alternative viewpoint by positioning virtual camera 214 at the center 404 of a center face of the next region. The process repeats until the evaluation at block 724 returns 'yes', indicating the candidate alternative viewpoint met the viewpoint switching condition.

In that case, processor 310 proceeds to block 726. At block 726 processor 310 evaluates local viewpoints, i.e., viewpoints on the same face around the center point. The goal is to find a local maximum score. A position on the face that provides a highest score is an optimal position from which to view the observation objects, on the given criteria of minTTI and C.

At block 728 a highest scoring candidate alternative viewpoint on the face is selected as the optimal viewpoint.

At block 730 processor 310 sends the optimal viewpoint to the display interface 330, whereby views from the optimal viewpoint are rendered on the display device.

Figure 8:
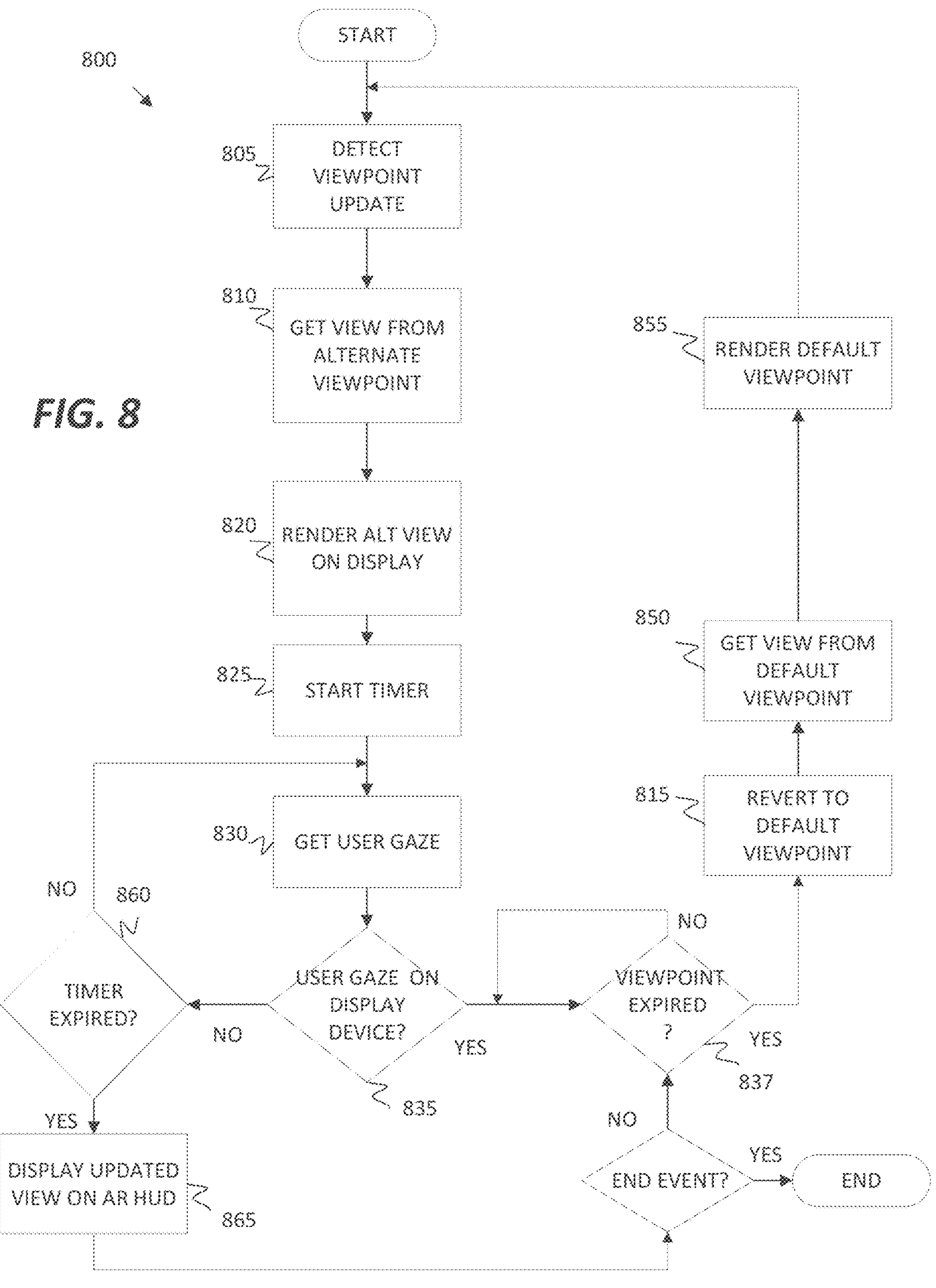
FIG. 8 is a flowchart of a method for notifying a user of a change in a planned path resulting from a viewpoint switch.

FIG. 8 is a flowchart of a method 800 for alerting a vehicle occupant to a viewpoint update. Some vehicles include a touchscreen display and/or instrument panel display, and a head up display (HUD). An ADAS feature may detect occurrence of an exceptional event that triggers an update in a default viewpoint. In some implementations, the exceptional event is the identification of an optimal viewpoint that is not the default viewpoint. For example, a driving situation may arise wherein a number of detected objects in a path not in the default view increases from a number below a threshold value to a number above the threshold value. This event can trigger a change from the default viewpoint to a viewpoint that gives an updated view that includes the path with the high number of objects. In this situation, the updated view provides situational information for the vehicle occupant. Method 800 alerts the vehicle occupant to the updated view.

At block 805 processor 310 detects a viewpoint update.

At block 810 processor 310 retrieves an updated view from the updated viewpoint. At block 820 the updated view is rendered on the ADAS display.

At block 825 processor 310 starts a timer. At block 830 processor 310 receives an indication of a direction of gaze of a vehicle occupant. At block 835 processor 310 evaluates the direction of gaze to determine if the gaze is on the ADAS display.

If not, at block 860 processor 310 checks the timer to determine if the time has expired. If the time has not expired, processor 310 returns to block 830 to re-check the user's gaze and at 835 determines whether the user's gaze is on the display device.

Blocks 835, 860 and 830 repeat until either the timer expired inquiry at block 860 is positive, or processor 310 determines at block 835 the vehicle occupant has directed their gaze to the ADAS display, whichever comes first. If the user has not directed their gaze to the ADAS display by the time the timer expires at block 860, processor 310 proceeds to block 865. At block 865 processor 310 displays the updated view on the head-up display (HUD) where it will be more noticeable to the vehicle occupant.

At block 837 a determination is made as to whether the event that triggered the updated viewpoint has expired. If not, the method waits until the viewpoint expires at block 837. If it has expired, processor 310 proceeds to block 815. At block 815 processor 310 changes the ADAS viewpoint to its last default viewpoint. At block 850 a view from the default viewpoint is retrieved. At block 855 the view is rendered and the method returns to 805 and waits until another viewpoint update is detected.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein.

What is claimed is:

1. An apparatus comprising:

a processor;

a memory communicatively coupled to the processor and storing processor executable instructions that configure the processor to:

render on a display device of a vehicle, a default view of a 3D virtual driving space from a default viewpoint of a virtual camera;

generate an alternative viewpoint for the virtual camera by constructing a viewpoint vector extending from a position of the virtual camera in the 3D virtual driving space to a position on a ground plane in a top plan view of a real-world driving space;

change a viewpoint of the virtual camera from the default viewpoint to the alternative viewpoint based on a viewpoint switching condition that compares a score of a view from the alternative viewpoint to a score of a view from the default viewpoint, wherein the default viewpoint and the alternative viewpoint include respective orientations; and provide a view of the 3D virtual driving space from the alternative viewpoint to a display interface, whereby the view of the 3D virtual driving space from the alternative viewpoint is rendered on the display device.

2. The apparatus of claim 1, wherein the processor is further configured to:

obtain respective first view scores of corresponding respective views from corresponding respective candidate alternative viewpoints of the virtual camera; and select as the alternative viewpoint, a respective candidate alternative viewpoint with a highest of the respective first view scores.

3. The apparatus of claim 1, wherein the processor is further configured to:

identify observation objects including the vehicle on the ground plane within a field of view (FoV) of the virtual camera from the alternative viewpoint; and evaluate the alternative viewpoint on the viewpoint switching condition based on a motion parameter of the observation objects within the FoV.

4. The apparatus of claim 1, wherein the processor is further configured to:

obtain a first count of first observation objects on the ground plane within a field of view of the virtual camera from the alternative viewpoint;

obtain a second count of second observation objects on the ground plane within a field of view (FoV) of the virtual camera from the default viewpoint; and test the alternative viewpoint on the viewpoint switching condition by comparing the first count to the second count.

5. The apparatus of claim 1, further comprising a scenario table that maps respective driving scenarios to corresponding respective default viewpoints, wherein the processor is further configured to:

receive real-time motion data and planned path of the vehicle;

identify a scenario corresponding to the real-time motion data and planned path; and identify a default viewpoint corresponding to the scenario, thereby identifying the default viewpoint.

6. The apparatus of claim 1, wherein the processor is further configured to:

identify observation objects including the vehicle on the ground plane;

assign motion parameter values to the observation objects;

receive a first path view preference via a user interface;

select a first viewing region based on the first path view preference and the motion parameter values; and generate a candidate alternative viewpoint in the first viewing region.

7. The apparatus of claim 6, wherein the processor is further configured to:

receive a second path view preference via the user interface;

select a second viewing region based on the second path view preference and the motion parameter values; and generate the candidate alternative viewpoint in the second viewing region.

8. The apparatus of claim 6, wherein the processor is further configured to:

generate the candidate alternative viewpoint in the first viewing region by constructing a viewpoint vector from a center of a first face of the first viewing region to the vehicle on the ground plane;

identify observation objects within a FoV of the virtual camera from the candidate alternative viewpoint;

test the candidate alternative viewpoint on the viewpoint switching condition based on a motion parameter of observation objects on the ground plane within a FoV of the virtual camera from the candidate alternative viewpoint;

based on the test, generate first local candidate alternative viewpoints to identify a first local maximum score; and select a local candidate alternative viewpoint on the first face based on the first local maximum score.

9. The apparatus of claim 8, wherein the processor is further configured to:

receive an adjustment to the viewpoint switching condition via a user interface;

re-test the candidate alternative viewpoint based on the adjustment; and based on a result of the re-test, change the viewpoint of the virtual camera to a position on a second face of the first viewing region.

10. The apparatus of claim 9, wherein the processor is further configured to:

identify observation objects within a FoV of the virtual camera on the second face of the first viewing region;

score the viewpoint based on the observation objects within the FoV of the virtual camera; and evaluate the viewpoint switching condition based on the adjustment.

11. A method comprising:

rendering on a display device of a vehicle, a default view of a 3D virtual driving space from a default viewpoint of a virtual camera;

generating an alternative viewpoint for the virtual camera by constructing a viewpoint vector extending from a position of the virtual camera in the 3D virtual driving space to a position on a ground plane in a top plan view of a real-world driving space;

changing a viewpoint of the virtual camera from the default viewpoint to the alternative viewpoint based on a viewpoint switching condition that compares a score of a view from the alternative viewpoint to a score of a view from the default viewpoint, wherein the default viewpoint and the alternative viewpoint include respective orientations; and providing a view of the 3D virtual driving space from the alternative viewpoint to a display interface, whereby the view of the 3D virtual driving space from the alternative viewpoint is rendered on a display device.

12. The method of claim 11, comprising:

obtaining respective first view scores of corresponding respective views from corresponding respective candidate alternative viewpoints of the virtual camera; and selecting as the alternative viewpoint, a respective candidate alternative viewpoint with a highest of the respective first view scores.

13. The method of claim 11, comprising:

identifying observation objects including the vehicle on the ground plane within a field of view (FoV) of the virtual camera from the alternative viewpoint; and testing the alternative viewpoint on the viewpoint switching condition based on a motion parameter of the observation objects within the FoV.

14. The method of claim 11, comprising:

obtaining a first count of first observation objects on the ground plane within a field of view of the virtual camera from the alternative viewpoint;

obtaining a second count of second observation objects on the ground plane within a field of view (FoV) of the virtual camera from the default viewpoint; and testing the alternative viewpoint on the viewpoint switching condition by comparing the first count to the second count.

15. The method of claim 11, further comprising:

receiving real-time motion data and planned path of the vehicle;

identifying a scenario corresponding to the real-time motion data and planned path; and identifying a default viewpoint corresponding to the scenario, thereby identifying the default viewpoint.

16. The method of claim 11, comprising:

identifying observation objects including the vehicle on the ground plane;

assigning motion parameter values to the observation objects;

receiving a first path view preference via a user interface;

selecting a first viewing region based on the first path view preference and the motion parameter values; and generating a candidate alternative viewpoint in the first viewing region.

17. The method of claim 16, comprising:

receiving a second path view preference via the user interface;

selecting a second viewing region based on the second path view preference and the motion parameter values; and generating the candidate alternative viewpoint in the second viewing region.

18. The method of claim 16, comprising:

generating the candidate alternative viewpoint in the first viewing region by constructing a viewpoint vector from a center of a first face of the first viewing region to the vehicle on the ground plane;

identifying observation objects within a FoV of the virtual camera from the candidate alternative viewpoint;

testing the candidate alternative viewpoint on the viewpoint switching condition based on a motion parameter of observation objects on the ground plane within a FoV of the virtual camera from the candidate alternative viewpoint;

based on the test, generating first local candidate alternative viewpoints to identify a first local maximum score; and selecting a local candidate alternative viewpoint on the first face based on the first local maximum score.

19. The method of claim 18, comprising:

receiving an adjustment to the viewpoint switching condition via a user interface;

re-testing the candidate alternative viewpoint based on the adjustment; and based on a result of the re-test, changing the viewpoint of the virtual camera to a position on a second face of the first viewing region.

20. The method of claim 19, comprising:

identifying observation objects within a FoV of the virtual camera on the second face of the first viewing region;

scoring the viewpoint based on the observation objects within the FoV of the virtual camera; and evaluating the switching condition based on the adjustment.

* * * * *